United States Patent
Tiemann (10) Patent No.: US 7,190,158 B2
(45) Date of Patent: Mar. 13, 2007

(54) INDUCTIVE ANGLE-OF-ROTATION SENSOR AND ROTARY TRANSDUCER EQUIPPED WITH THE SAME

(75) Inventor: Marc Oliver Tiemann, Nussdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 86 days.

(21) Appl. No.: 10/841,304

(22) Filed: May 7, 2004

(65) Prior Publication Data

US 2004/0222787 A1    Nov. 11, 2004

(30) Foreign Application Priority Data

May 9, 2003   (DE) ................ 103 20 990

(51) Int. Cl.
- *G01B 7/30* (2006.01)
- *G01R 33/02* (2006.01)
- *H01F 5/04* (2006.01)

(52) U.S. Cl. ............. 324/207.17; 324/207.25
(58) Field of Classification Search ......... 324/207.15, 324/207.16, 207.17, 207.24, 207.25; 33/706, 33/708

See application file for complete search history.

(56) References Cited

U.S. PATENT DOCUMENTS

| | | | | |
|---|---|---|---|---|
| 5,475,302 | A * | 12/1995 | Mehnert et al. | 324/207.21 |
| 5,619,132 | A * | 4/1997 | Spies | 314/207.21 |
| 5,627,466 | A * | 5/1997 | Spies et al. | 324/207.21 |
| 6,011,389 | A * | 1/2000 | Masreliez et al. | 324/207.17 |
| 6,054,851 | A * | 4/2000 | Masreliez et al. | 324/207.17 |
| 6,111,402 | A | 8/2000 | Fischer | |
| 6,157,188 | A * | 12/2000 | Steinke | 324/207.17 |
| 6,522,128 | B1 * | 2/2003 | Ely et al. | 324/207.17 |
| 6,534,970 | B1 * | 3/2003 | Ely et al. | 324/207.17 |
| 6,828,783 | B2 * | 12/2004 | Schroter et al. | 324/207.25 |
| 6,980,134 | B2 * | 12/2005 | Ely et al. | 341/20 |

FOREIGN PATENT DOCUMENTS

DE    197 51 853    6/1998

* cited by examiner

*Primary Examiner*—Edward Lefkowitz
*Assistant Examiner*—Kenneth J. Whittington
(74) *Attorney, Agent, or Firm*—Kenyon & Kenyon LLP (57) ABSTRACT

An inductive angle-of-rotation sensor, which is composed of a printed-circuit board, on which an excitation printed conductor and a receiving printed conductor are applied, the receiving printed conductor having a first partial section, which extends in a first plane, and a second partial section, which runs in a second plane. In addition, the inductive angle-of-rotation sensor has a graduation element, which is rotatable in relation to the printed-circuit board and includes a graduation track, which is composed of alternately arranged, electrically conductive and non-conductive graduation regions. The receiving printed conductor supplies an uneven number of signal periods within one rotation relatively to the graduation element. The first partial section of the receiving printed conductor is substantially greater in length than the second partial section. Moreover, a rotary transducer may be equipped with this angle-of-rotation sensor.

11 Claims, 5 Drawing Sheets

INDUCTIVE ANGLE-OF-ROTATION SENSOR AND ROTARY TRANSDUCER EQUIPPED WITH THE SAME

CROSS-REFERENCE TO RELATED APPLICATIONS

The present application claims priority to application Ser. No. 103 20 990.5, filed in the Federal Republic of Germany on May 9, 2003, which is expressly incorporated herein in its entirety by reference thereto.

FIELD OF THE INVENTION

The present invention relates to an inductive angle-of-rotation sensor for determining relative angular positions and to a rotary or position transducer equipped with the same.

BACKGROUND INFORMATION

Inductive angle-of-rotation sensors are used, for example, in rotary transducers to determine the angular position of two machine parts that are rotatable relatively to one another. In inductive angle-of-rotation sensors, excitation coils and receiving coils, for instance, in the form of printed conductors, are applied to a shared printed-circuit board, which is permanently connected, for example, to a stator of a rotary transducer. Disposed oppositely to this printed-circuit board is another board, e.g., in the form of a graduated disk, on which electrically conductive and non-conductive surfaces are applied so as to alternate in regular intervals, forming a graduation region or graduation structure, and which is connected in a torsionally fixed manner to the rotor of the rotary transducer. When an electric excitation field, alternating with respect to time, is applied to the excitation coils, signals are generated in the receiving coils as a function of the angular position during the relative rotation between the rotor and stator. These signals are then processed further in an evaluation electronics. Typically, the components of such an evaluation electronics are accommodated on another printed-circuit board.

Rotary transducers having inductive angle-of-rotation sensors are used as measuring devices for electrical drives, to determine the absolute angular position of corresponding drive shafts. In many fields of application of such angle-of-rotation sensors or rotary encoders, the need has existed for some time to miniaturize these devices.

German Published Patent Application No. 197 51 853 of the Applicant hereof describes a design for an inductive angle-of-rotation sensor, where the excitation and receiving coils are configured in a multi-layer printed-circuit board structure. When reducing the size of such an angle-of-rotation sensor, particularly when reducing the diameter of the scanning circuit board, it becomes evident that the receiving printed conductors, in particular, which supply signals having one signal period over one rotation, produce an intolerable offset error.

It is an aspect of the present invention to provide an inductive angle-of-rotation sensor, which may allow an excellent signal quality to be attained, even when working with the smallest sizes. An aspect of the present invention may also provide a reliable rotary transducer having small outer dimensions.

SUMMARY

The above and other beneficial aspects of the present invention may be achieved by providing an inductive angle-of-rotation sensor as described herein and by providing a rotary transducer equipped with the same.

In accordance with an example embodiment of the present invention, at least one receiving printed conductor on one printed-circuit board supplies an uneven number of signal periods within one rotation relatively to the graduation element, this receiving printed conductor having a first and a second partial section. These partial sections extend in different planes, the first partial section being greater in length than the second. This may make it possible for the offset error of the corresponding signals to be significantly reduced.

In this context, the partial sections may be divided, in turn, into a plurality of partial segments. Thus, a partial section of a receiving printed conductor should be understood as a region of a receiving printed conductor that, in some instances, is discontinuous and that extends in one plane.

In an example embodiment of the present invention, the first partial section of the receiving printed conductor has at least 1.5 times, e.g., at least 3 times, the length of the second partial section.

A plurality of such receiving printed conductors may be applied to the printed-circuit board. In an example embodiment of the present invention, each of the longer partial sections may be situated in one and the same plane. This type of construction may minimize amplitude errors or differences in the amplitude of the signals of the individual receiving printed conductors, because the longer partial sections are then each spaced equidistantly from the graduation element.

According to an example embodiment of the present invention, an inductive angle-of-rotation sensor includes: a printed-circuit board, an excitation printed conductor and at least one receiving printed conductor arranged on the printed-circuit board, the at least one receiving printed conductor including a first partial section, which extends in a first plane, and a second partial section, which extends in a second plane; and a graduation element rotatable in relation to the printed-circuit board, the graduation element including a graduation track, the graduation track including alternately arranged, electrically conductive and non-conductive graduation regions. The at least one receiving printed conductor is configured to supply an uneven number of signal periods within one rotation relatively to the graduation element, and the first partial section of the at least one receiving printed conductor is substantially greater in length than the second partial section.

The length of the first partial section of the receiving printed conductor may be at least 1.5 times a length of the second partial section.

The length of the first partial section of the receiving printed conductor may be at least 3 times a length of the second partial section.

A plurality of receiving printed conductors may be arranged on the printed-circuit board, each receiving printed conductor having a respective first partial section extending in a first plane and a respective second partial section extending in a second plane, the first partial sections extending in the same plane.

The at least one receiving printed conductor may be configured to supply one signal period within one rotation relatively to the graduation element.

The printed-circuit board may include a multilayer structure, and the first and second partial sections of the at least one receiving printed conductor may be arranged on different sides of a non-conductive layer.

The first plane may be arranged in closer proximity to the graduation element than the second plane.

According to an example embodiment of the present invention, a rotary transducer includes an inductive angle-of-rotation sensor as described herein.

Further example embodiments of the present invention are described herein.

Further aspects of the inductive angle-of-rotation sensor and details pertaining thereto, as well as of the rotary encoder equipped with the same, are set forth in the following description of an exemplary embodiment with reference to the appended Figures.

DETAILED DESCRIPTION

Figure 1:
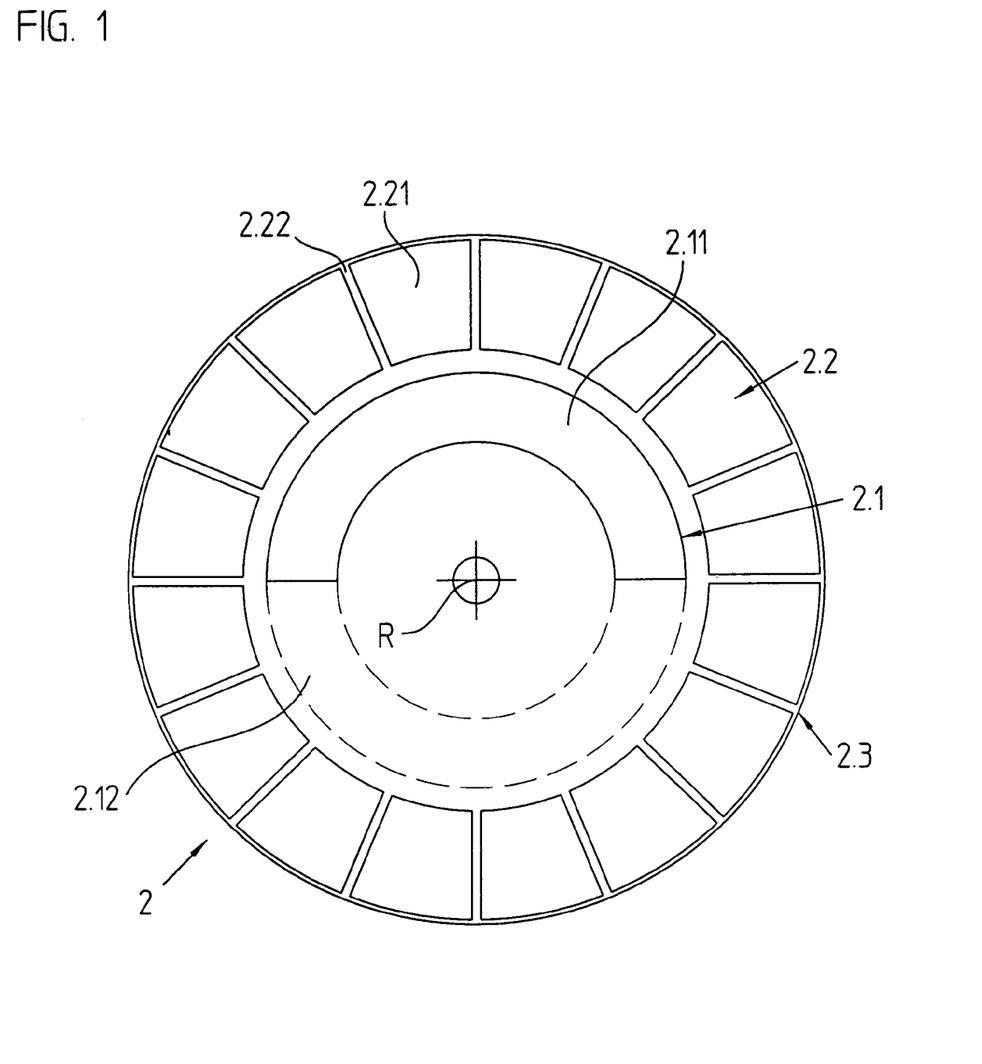
FIG. 1 is a plan view of a graduated disk.
Figure 2:
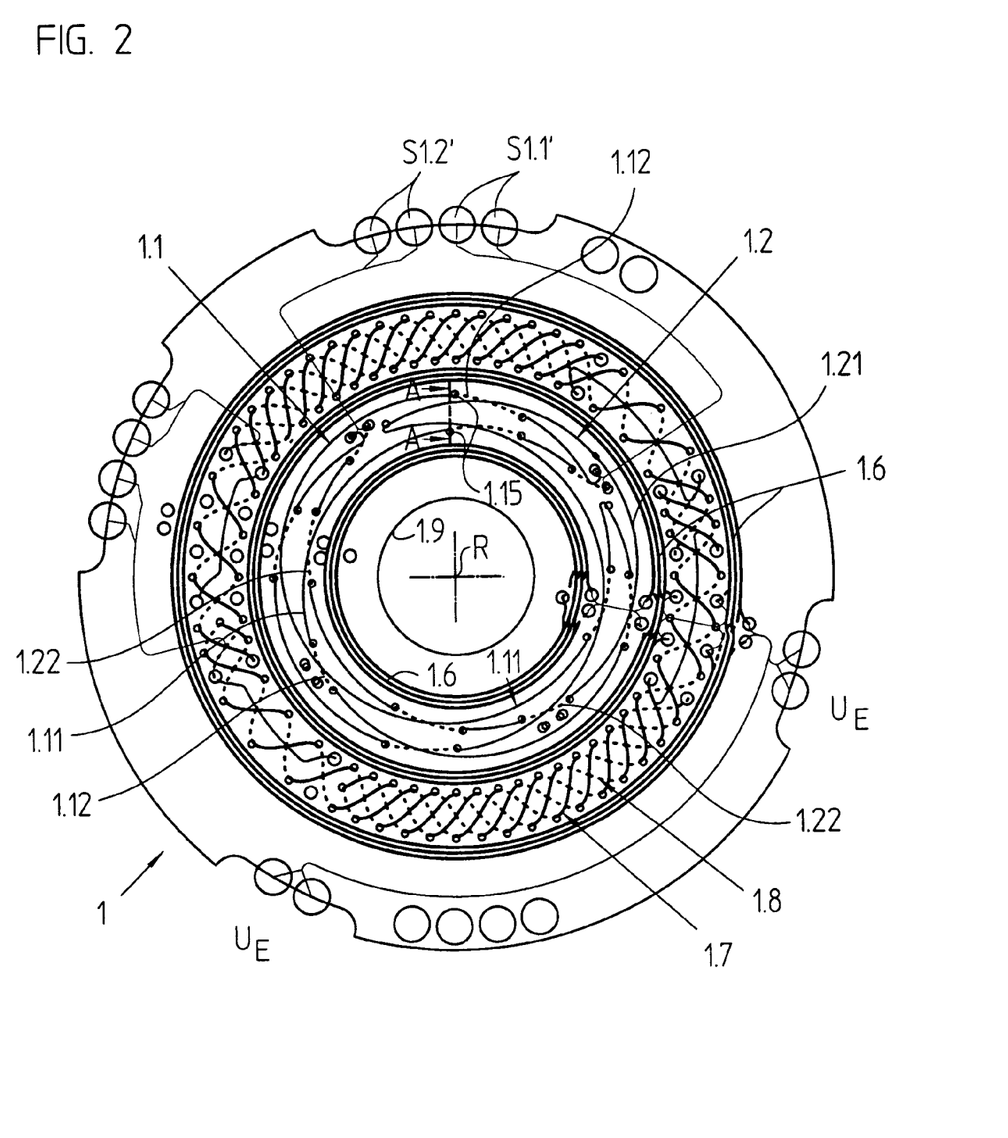
FIG. 2 is a plan view of a scanning circuit board.
Figure 3:
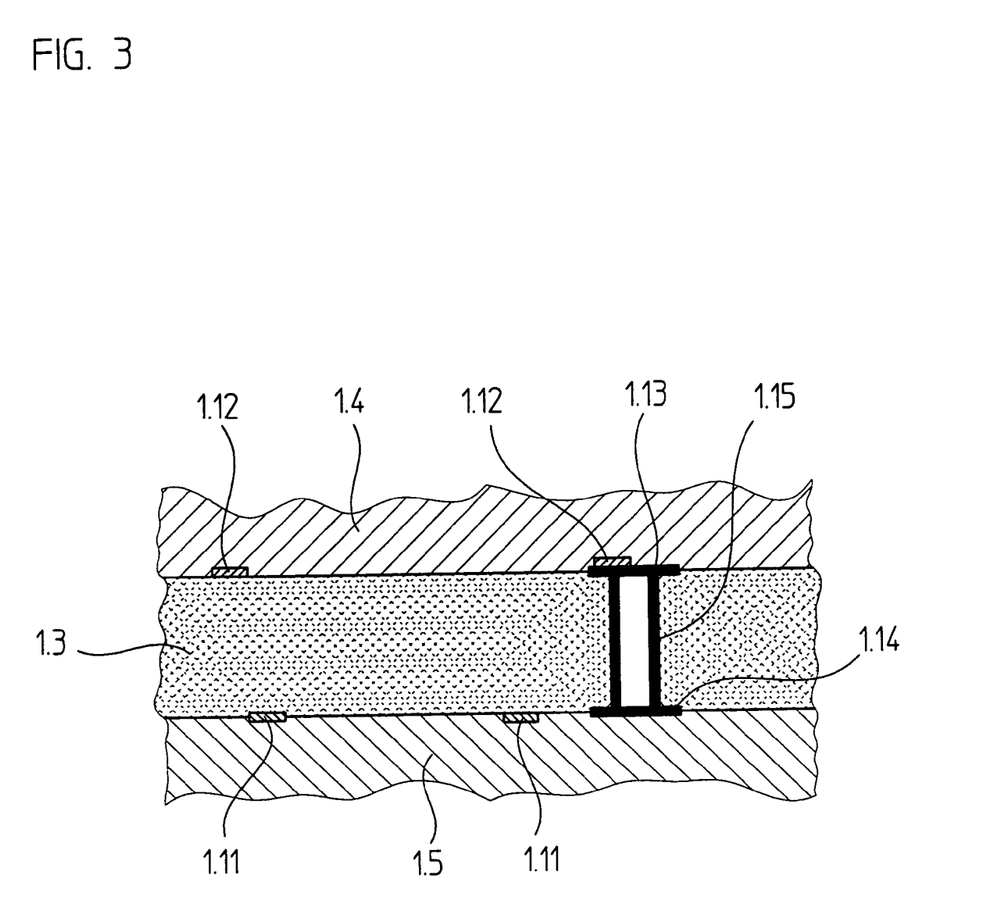
FIG. 3 is a schematic partial cross-sectional view through the scanning circuit board.

The basic design of an angle-of-rotation sensor in accordance with an example embodiment of the present invention is illustrated in FIGS. 1 to 3. FIG. 1 shows a graduation element in the form of a circular graduated disk 2. Graduated disk 2 is made up of a substrate 2.3, which, in the illustrated exemplary embodiment, is fabricated from epoxy resin, and on which two graduation or graduation tracks 2.1, 2.2 are arranged. Graduation tracks 2.1, 2.2 have a circular form and are concentrically arranged, with respect to an axis of rotation R, with different diameters on substrate 2.3. The two graduation tracks 2.1, 2.2 are each composed of a regular sequence of alternately arranged electrically conductive graduation regions 2.11, 2.21 and non-conductive graduation regions 2.12, 2.22. As material for electrically conductive graduation regions 2.11, 2.21 in the illustrated example, copper is applied to substrate 2.3. On the other hand, substrate 2.3 is not coated in non-conductive graduation regions 2.12, 2.22.

In the illustrated example embodiment, inner graduation track 2.1 is made of a first semi-circular graduation region 2.11 having electrically conductive material, in this case copper, as well as of a second semi-circular graduation region 2.12, in which no conductive material is located.

Radially adjacent to first graduation track 2.1 is second graduation track 2.2 on substrate 2.3, graduation track 2.2 also being composed of a multiplicity of electrically conductive graduation regions 2.21, as well as of non-conductive graduation regions 2.2 placed therebetween. In this context, the various graduation regions 2.21, 2.22 are formed, in terms of material, in the same manner as graduation regions 2.11, 2.12 of first graduation track 2.1. In the illustrated exemplary embodiment, second graduation track 2.2 includes altogether sixteen regularly spaced, electrically conductive graduation regions 2.21, as well as, correspondingly, sixteen non-conductive graduation regions 2.22 placed therebetween.

Scanning circuit board 1 shown in FIG. 2, provided for scanning graduated disk 2, includes receiving printed conductors 1.1, 1.2 as receiving coils in an inner receiving track and other receiving printed conductors 1.7, 1.8 in an outer receiving track. In this case, the matching pairs of receiving printed conductors 1.1, 1.2; 1.7, 1.8 of a particular receiving track are offset from one another.

Moreover, as excitation coils on scanning circuit board 1, excitation printed conductors 1.6 are provided, which are applied to an inner, a middle, and an outer excitation track. Scanning circuit board 1 itself has a center bore hole 1.9 and is formed with a plurality of layers.

FIG. 3 illustrates a partial section A—A of scanning circuit board 1. On one side of a core layer 1.3, thus in a first plane, a first partial section 1.11, 1.21 of receiving printed conductors 1.1, 1.2 is applied, in part-sectional view A—A, only first partial section 1.11 of first receiving printed conductors 1.1 being visible. On the other side of core layer 1.3, thus in a second plane, second partial sections 1.12, 1.22 of receiving printed conductors 1.1, 1.2, respectively, are applied. However, in part-sectional view A—A, only second partial sections 1.12 of receiving printed conductors 1.1 are visible. Moreover in core layer 1.3 formed as a non-conductive layer, vias 1.15, realized, in principle, as buried vias, are provided in the layer structure of scanning circuit board 1. On both surfaces of core layer 1.3, pads 1.13, 1.14 are arranged, respectively, in the area of vias 1.15. This allows for contacting of printed conductors which are situated on different sides of core layer 1.3. Part-sectional view A—A extends through such a via 1.15 having corresponding pads 1.13, 1.14, at one pad 1.14, a second partial section 1.12 of first receiving printed conductors being 1.1 contacted. In this context, for reasons of production engineering, the diameter of the contact surface of pads 1.13, 1.14 is larger (here 500 µm) than the width of receiving printed conductors 1.1, 1.2 (here 125 µm). Core layer 1.3 having receiving printed conductors 1.1, 1.2 is surrounded on both sides with a prepreg or preimpregnated board 1.4, 1.5. Moreover, scanning circuit board 1 has still other layers.

In FIG. 2, first partial sections 1.11, 1.21 of receiving printed conductors 1.1, 1.2 are shown in solid lines, and second partial sections 1.12, 1.22 of receiving printed conductors 1.1, 1.2 in dotted lines. Scanning circuit board 1 is configured such that first partial sections 1.11, 1.21 of receiving printed conductors 1.1, 1.2 are all applied on the same side of core layer 1.3, while the second, shorter partial sections 1.12, 1.22 of receiving printed conductors 1.1, 1.2, respectively, are all situated on the other side of core layer 1.3. Shorter partial sections 1.12, 1.22 are quasi used as bridges to avoid any cross-overs or short circuits in receiving printed conductors 1.1, 1.2. In this context, the two receiving printed conductors 1.1, 1.2 are composed of a plurality of partial segments, namely of first partial sections 1.11, 1.21 shown in solid lines, and of second partial sections 1.12, 1.22 shown in dotted lines. First partial sections 1.11, 1.21 of receiving printed conductors 1.1, 1.2 are substantially longer in length than second partial sections 1.12, 1.22 of receiving printed conductors 1.1, 1.2. In the illustrated example, the ratio of the lengths of first partial sections 1.11, 1.21 (corresponding to the sum of the matching partial segments) to the length of second partial sections 1.12, 1.22 is about 4.5. Therefore, first partial sections 1.11, 1.21 of receiving printed conductors 1.1, 1.2, respectively, have 4.5 times the length of second partial sections 1.12, 1.22.

In the assembled state, graduated disk 2 and scanning circuit board 1 mutually oppose one another, so that axis R extends through the center points of both elements, and, in response to a relative rotation between graduated disk 2 and scanning circuit board 1, a signal is able to be produced as a function of the particular angular position, by induction effects in scanning circuit board 1.

The condition for producing such signals is that excitation printed conductors 1.6 generate an electromagnetic excitation field that alternates with respect to time, in the area of the scanning tracks, i.e., in the area of graduation tracks 2.1 and 2.2 scanned by these. In the illustrated exemplary embodiment, excitation printed conductors 1.6 are designed as a plurality of planar-parallel, energized individual printed conductors. If excitation printed conductors 1.6 of one printed conductor unit all carry current in the same direction, then an electromagnetic field having a tubular or cylindrical orientation forms around the particular printed conductor unit. The flux lines of the resulting electromagnetic field extend in concentric circles around the printed conductor units, the direction of the flux lines depending in a generally conventional manner on the current direction in the printed conductor units.

In this context, an opposite current direction, i.e., an opposite interconnection is to be selected for the printed conductor units directly adjoining a shared scanning track, so that the flux lines in the area of the scanning tracks have an identical orientation. Excitation printed conductors 1.6 are supplied with a supply voltage that alternates with respect to time via supply voltage taps UE illustrated in FIG. 2.

Figure 4:
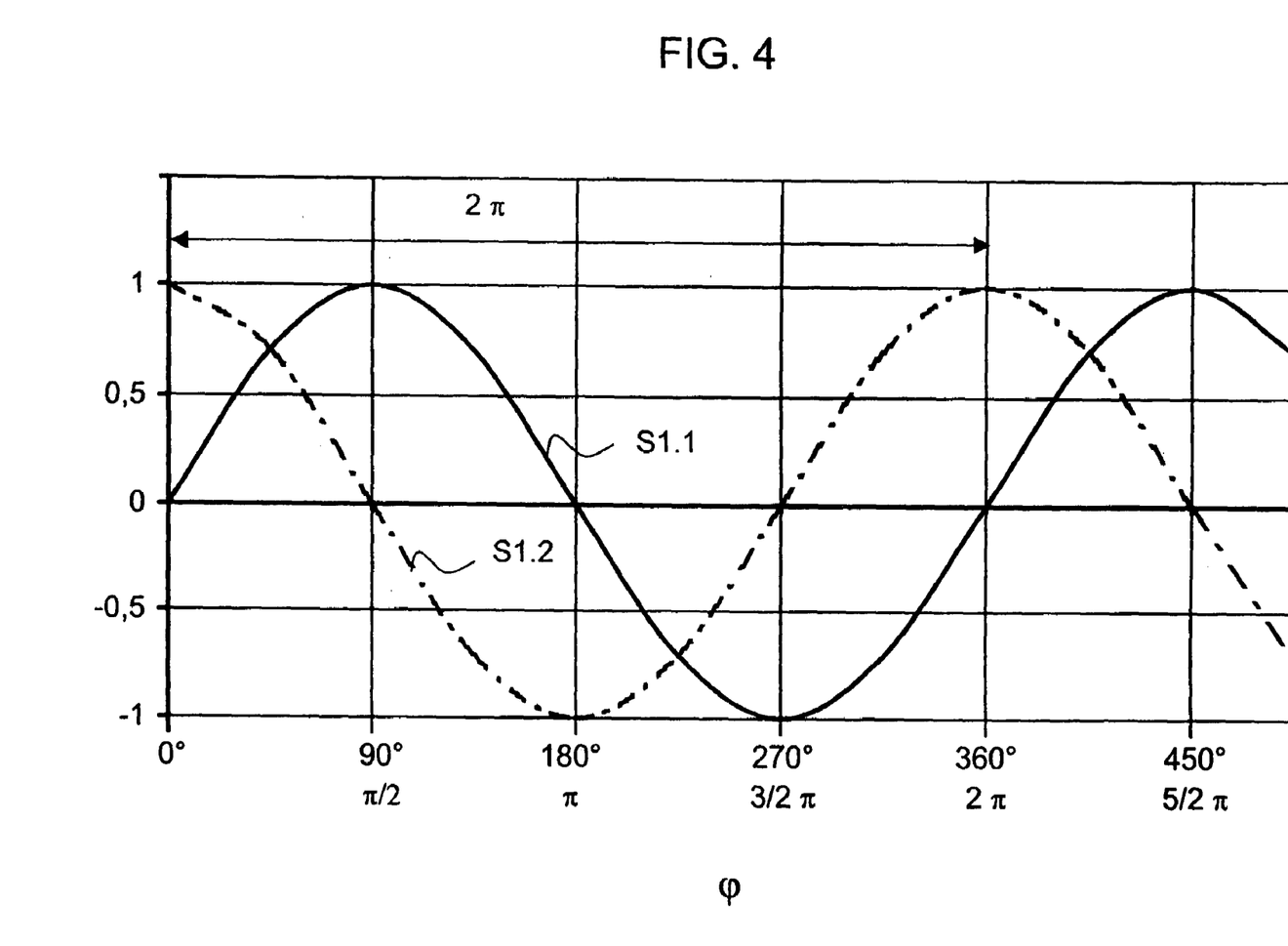
FIG. 4 illustrates a signal curve, as supplied by the inner receiving printed conductors.

During operation of angle-of-rotation sensor, induction effects cause inner receiving printed conductors 1.1, 1.2 to each supply one single signal period during scanning of graduation track 2.1. Because of the offset arrangement of receiving printed conductors 1.1, 1.2 on core layer 1.3, two induced output signals S1.1', S1.2' having a 90° phase offset result during operation of the angle-of-rotation sensor. Output signals S1.1', S1.2' are amplitude-modulated and are demodulated with the aid of an evaluation electronics in a succeeding step, so that sinusoidal signals S1.1, S1.2 are formed, as shown in FIG. 4. In this context, it is apparent that, at an angle of rotation of 2Π, thus 360°, one signal period is produced.

Thus the scanning of graduation track 2.1 may yield relatively rough, absolute positional information within one rotation of graduated disk 2 about axis of rotation R. These signals provide a unique, absolute position signal within one rotation of a shaft 4 (see FIG. 5). By evaluating the 90° phase-displaced signals S1.1, S1.2 in a generally conventional manner, a directional recognition may also be ensured during the angular motion.

Receiving printed conductors 1.1, 1.2 are applied in two separate work steps, i.e., in two separately implemented pattern-delineation processes, initially to the one side of core layer 1.3, and subsequently to the other, opposite side of core layer 1.3. Therefore, due to production tolerances, partial sections 1.11 may be unavoidably shifted in relation to partial sections 1.12 (i.e., partial sections 1.21 in relation to partial sections 1.22) to a greater or lesser degree, when applied to the particular side of core layer 1.3. Nevertheless, within the scope of the allowable displacement tolerances, a reliable contacting may be ensured, because of the larger diameter of the contact surface of pads 1.13, 1.14, as compared to the width of receiving printed conductors 1.1, 1.2.

For this reason, the arrangement in which first partial sections 1.11, 1.21 of receiving printed conductors 1.1, 1.2 are substantially greater in length than second partial sections 1.12, 1.22 of receiving printed conductors 1.1, 1.2, may have a considerable advantage over conventional systems in terms of signal quality. Namely, the induced voltage is dependent on the enclosed coil surface, i.e., in the illustrated example, on the enclosed surfaces of receiving printed conductors 1.1, 1.2. In conventional systems, in which the partial sections of the printed conductors are applied in equal shares to the two different surfaces of a board, the displacement inherent in the manufacturing process results in a noticeable difference in the particular coil surface.

Since the signals, which result from the two mutually opposing partial surfaces, have a different operational sign, and a voltage that differs from the amount is induced in the two coils, an offset results in the signal at the coils of the conventional systems having unfavorable actual displacements.

As the result of a mutual displacement of receiving printed conductors 1.1, 1.2, which are applied to different sides of core layer 1.3, no significant offset error may occur, because the coil surface is virtually unchanged as a result. Namely, the major part of the coil, i.e., in each instance first partial sections 1.11, 1.21, is applied to one and the same side of core layer 1.3, and may thus be very precisely fixed. Thus, a displacement of partial sections 1.11 in relation to partial sections 1.12 on the other side of core layer 1.3 (i.e., partial sections 1.21 with respect to partial sections 1.22) may produce a negligible measuring error. On the other hand, by expending comparatively little outlay for manufacturing precision, an example embodiment of the present invention may provide precisely working angle-of-rotation sensors to be manufactured.

The other receiving printed conductors 1.7, 1.8 on the second outer scanning track are applied to both sides of core layer 1.3 and are used for scanning second graduation track 2.2. A relative offset is provided between the two receiving printed conductors 1.7, 1.8, so that, on the output side, in response to scanning of second graduation track 2.2, two signals having a 90° phase offset are generated.

Receiving printed conductors 1.7, 1.8 each have sixteen, thus $2^4$ windings, so that they may allow a comparatively high-resolution incremental signal to be produced in response to the relative motion of graduated disk 2 with respect to scanning circuit board 1. In connection with the rough, absolute positional determination using first graduation track 2.1, a high-resolution, absolute angle-of-rotation determination is possible using an arrangement of this kind. The other receiving printed conductors 1.7, 1.8 are formed such that, in contrast to inner receiving printed conductors 1.1, 1.2, with respect to their length, they are distributed more or less uniformly over the two sides of core layer 1.3. There is no need for an uneven distribution of the lengths of the other receiving printed conductors 1.7, 1.8 on the two sides of core layer 1.3, i.e., in two different planes, given an even number of windings (i.e., in the case of the other receiving printed conductors 1.7, 1.8, which supply an even number of signal periods within one rotation), because they cancel offset errors through mutual compensation, so that, in the result, a negligible error is to be ascertained.

However, this compensation effect does not exist in the case of receiving printed conductors 1.1, 1.2, which supply an uneven number of signal periods within one rotation. Thus, the foregoing is not limited to angle-of-rotation sensors where receiving printed conductors 1.1, 1.2 supply only one signal period within one rotation. Rather, in accordance with an example embodiment of the present invention, receiving printed conductors 1.1, 1.2 may also be formed such that three, five or more uneven signal periods are able to be generated within one rotation.

Figure 5:
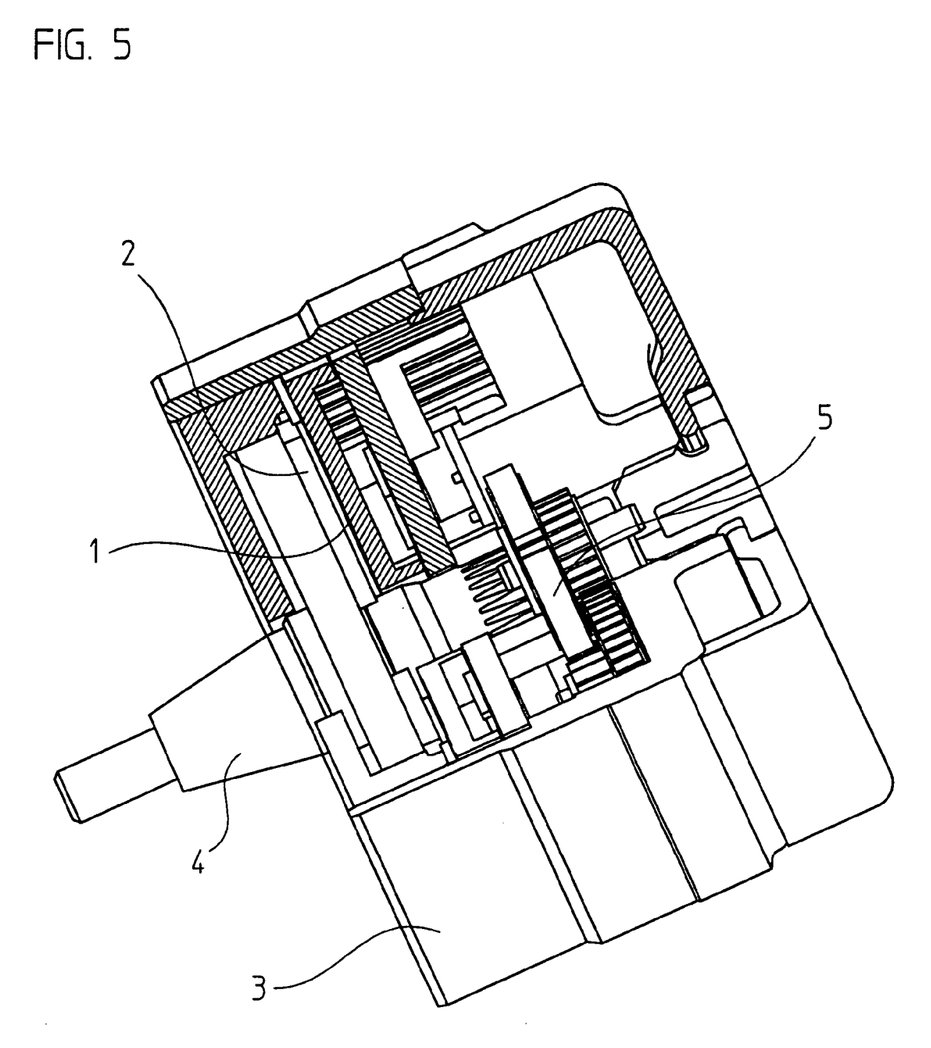
FIG. 5 is a perspective view of a rotary encoder having a housing, opened up for purposes of illustration.

FIG. 5 shows a rotary transducer, which is equipped with the inductive angle-of-rotation sensor in accordance with an example embodiment of the present invention. The rotary transducer has a stationary housing 3 and shaft 4 which is rotatable in relation to the housing. Graduated disk 2 having graduation tracks 2.1, 2.2, is torsionally fixed to shaft 4. On the other hand, scanning circuit board 1 is secured to housing 3. Moreover, the rotary transducer includes a reduction gear 5, which is required for a multi-turn functionality of the rotary transducer. A significantly smaller rotary transducer may be assembled because of the compact design of the inductive angle-of-rotation sensor, in particular of scanning circuit board 1.

To increase the amplitude of the signals of receiving conductor tracks 1.1, 1.2, the longer first partial sections 1.11, 1.21 of receiving printed conductors 1.1, 1.2 are all applied on the same side of core layer 1.3 which faces graduated disk 2, respectively, is closer to graduated disk 2 than the second, shorter partial sections 1.12, 1.22 of receiving printed conductors 1.1, 1.2, situated on the other side of core layer 1.3. Shorter partial sections 1.12, 1.22, which are quasi used as bridges to avoid any cross-overs or short circuits in receiving printed conductors 1.1, 1.2, are thus in the rotary transducer on that side of core layer 1.3 which faces away from graduated disk 2. The signal amplitude is increased by the shorter distance of longer partial sections 1.11, 1.21 of receiving printed conductors 1.1, 1.2 to graduated disk 2.

What is claimed is:

1. An inductive angle-of-rotation sensor, comprising:
    a printed-circuit board, an excitation printed conductor and at least one receiving printed conductor arranged on the printed-circuit board, the at least one receiving printed conductor including first partial segments, which extend in a first plane, and second partial segments, which extend in a second plane; and
    a graduation element rotatable in relation to the printed-circuit board, the graduation element including a graduation track, the graduation track including alternately arranged, electrically conductive and non-conductive graduation regions;
    wherein the at least one receiving printed conductor is configured to supply an uneven number of signal periods within one rotation relatively to the graduation element; and
    wherein the first partial segments of the at least one receiving printed conductor are in sum substantially greater in length than the second partial segments in sum.

2. The inductive angle-of-rotation sensor according to claim 1, wherein the combined length of the first partial segments of the receiving printed conductor is at least 1.5 times a combined length of the second partial segments.

3. The inductive angle-of-rotation sensor according to claim 1, wherein the first plane is arranged in closer proximity to the graduation element than the second plane.

4. The inductive angle-of-rotation sensor according to claim 1, wherein a plurality of receiving printed conductors are arranged on the printed-circuit board, each receiving printed conductor having respective first partial segments extending in a first plane and respective second partial segments extending in a second plane, the first partial segments extending in the same plane.

5. The inductive angle-of-rotation sensor according to claim 1, wherein the at least one receiving printed conductor is configured to supply one signal period within one rotation relatively to the graduation element.

6. The inductive angle-of-rotation sensor according to claim 1, wherein the printed-circuit board includes a multilayer structure, the first and second partial segments of the at least one receiving printed conductor arranged on different sides of a non-conductive layer.

7. An inductive angle-of-rotation sensor, comprising:
    a printed-circuit board, an excitation printed conductor and at least one receiving printed conductor arranged on the printed-circuit board, the at least one receiving printed conductor including a first partial section, which extends in a first plane, and a second partial section, which extends in a second plane; and
    a graduation element rotatable in relation to the printed-circuit board, the graduation element including a graduation track, the graduation track including alternately arranged, electrically conductive and non-conductive graduation regions;
    wherein the at least one receiving printed conductor is configured to supply an uneven number of signal periods within one rotation relatively to the graduation element;
    wherein the first partial section of the at least one receiving printed conductor is substantially greater in length than the second partial section, and
    wherein the length of the first partial section of the receiving printed conductor is at least 3 times a length of the second partial section.

8. A rotary transducer, comprising:
    an inductive angle-of-rotation sensor, the inductive angle-of-rotation sensor including:
        a printed-circuit board, an excitation printed conductor and at least one receiving printed conductor arranged on the printed-circuit board, the at least one receiving printed conductor including first partial segments, which extend in a first plane, and second partial segments, which extend in a second plane; and
        a graduation element rotatable in relation to the printed-circuit board, the graduation element including a graduation track, the graduation track including alternately arranged, electrically conductive and non-conductive graduation regions;
        wherein the at least one receiving printed conductor is configured to supply an uneven number of signal periods within one rotation relatively to the graduation element; and
        wherein the first partial segments of the at least one receiving printed conductor are in sum substantially greater in length than the second partial segments in sum.

9. The rotary transducer according to claim 8, wherein the first plane is arranged in closer proximity to the graduation element than the second plane.

10. An inductive angle-of-rotation sensor, comprising:
    a printed-circuit board, an excitation printed conductor and at least one receiving printed conductor arranged on the printed-circuit board, each receiving printed conductor including first partial segments, which extend in a first plane, and second partial segments, which extend in a second plane; and
    a graduation element rotatable in relation to the printed-circuit board, the graduation element including a graduation track, the graduation track including alternately arranged, electrically conductive and non-conductive graduation regions;

wherein the at least one receiving printed conductor is configured to supply an uneven number of signal periods within one rotation relatively to the graduation element; and wherein the first partial segments of the at least one receiving printed conductor are in sum substantially greater in length than the second partial segments in sum.

11. A rotary transducer, comprising:

an inductive angle-of-rotation sensor, the inductive angle-of-rotation sensor including:

a printed-circuit board, an excitation printed conductor and at least one receiving printed conductor arranged on the printed-circuit board, each receiving printed conductor including first partial segments, which extend in a first plane, and second partial segments, which extend in a second plane; and a graduation element rotatable in relation to the printed-circuit board, the graduation element including a graduation track, the graduation track including alternately arranged, electrically conductive and non-conductive graduation regions;

wherein the at least one receiving printed conductor is configured to supply an uneven number of signal periods within one rotation relatively to the graduation element; and wherein the first partial segments of the at least one receiving printed conductor are in sum substantially greater in length than the second partial segments in sum.

* * * * *